United States Patent
Tiesler et al.

(10) Patent No.: US 6,863,326 B1
(45) Date of Patent: Mar. 8, 2005

(54) LATERAL TRACK MOVEMENT SYSTEM

(75) Inventors: John M. Tiesler, Harrison Township, MI (US); Jim Mestemaker, Lambertville, MI (US); Michael C. Dykman, Lake Orion, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/730,293

(22) Filed: Dec. 8, 2003

(51) Int. Cl.[7] ................................................ B60J 9/00
(52) U.S. Cl. ..................................... 296/1.07; 296/210
(58) Field of Search ......................... 296/190.08, 1.07, 296/210, 214

(56) References Cited

U.S. PATENT DOCUMENTS

| | | | | |
|---|---|---|---|---|
| 5,497,968 A | * | 3/1996 | Hewko | 248/214 |
| 6,246,449 B1 | * | 6/2001 | Rosen | 296/37.7 |
| 6,364,390 B1 | * | 4/2002 | Finneman | 296/37.7 |
| 6,575,528 B2 | * | 6/2003 | Tiesler et al. | 296/214 |
| 2002/0163219 A1 | * | 11/2002 | Clark et al. | 296/37.8 |
| 2003/0234550 A1 | * | 12/2003 | Brooks et al. | 296/24.1 |

* cited by examiner

Primary Examiner—Jason Morrow
(74) Attorney, Agent, or Firm—Bill Panagos; Bliss McGlynn, P.C.

(57) ABSTRACT

A lateral track movement system for a display screen attached to the ceiling of a motor vehicle utilizing a dockable connector. This system allows the display screen to slide across tracks to any desired position along the track for more comfortable viewing of the display screen by the passengers in the motor vehicle. This system allows for the display screen to utilize a dockable connection so that the electrical connection is made at the point of connection, which is outside of the interior of the ceiling or side panels. This lateral track movement system comprises an upper reinforcement assembly, a carrier assembly, a lower reinforcement assembly, at least one wire, and a spool.

11 Claims, 2 Drawing Sheets

LATERAL TRACK MOVEMENT SYSTEM

FIELD OF THE INVENTION

This present invention relates to a structure for display screens that allows for lateral movement along the ceiling of a motor vehicle while utilizing a dockable connection for the display screens.

BACKGROUND OF THE INVENTION

Display screens have become very popular in passenger motor vehicles. These screens allow passengers to enjoy entertainment while riding in the vehicle. The screens are typically mounted to the ceiling of motor vehicles generally in front of the passenger seating area and can either have the display screen fixedly mounted to the ceiling of the motor vehicle or can allow for some slight movement of the screen. For example, many screens pivot 180 degrees around an axis for stowing the screen flat against the vehicles' ceiling and then pulling the screen down again for viewing. Consumers have liked this feature because the screen can then be accessed only when needed.

One problem these screens is that the screen cannot be moved from its fixed position on the ceiling. Therefore, while passengers may be able to pivot the screen for more comfortable viewing, they have not been able to physically move the screen to a more desired location. Since the display screens have been fixedly mounted to the ceiling of motor vehicles, some passengers have experienced obstructed viewing of the screen; others have found that while they want to enjoy entertainment while riding in the car, their co-riders may not be interested in viewing the screen at the same time. As a result, there has been a demand for a way of moving the display screen to varying positions on the ceiling so that passengers have the freedom to position the display screen at any variety of locations along the ceiling. Known display screens have not been able to meet consumer demand. The present invention acknowledges consumer demand and provides a solution to this common problem encountered by passengers. This invention also allows passengers to continue using a screen that pivots in all directions and utilizes a dockable connector.

SUMMARY OF THE INVENTION

A lateral track movement system for a display screen utilizing a dockable connector, in accord with the invention, comprises an upper reinforcement assembly, a carrier assembly, a lower reinforcement assembly, at least one wire, and a spool. This lateral track movement system is mounted to the ceiling of a motor vehicle in a position generally forward and parallel to the passenger seating areas.

In accord with this invention, the upper reinforcement system comprises an upper base, at least one track rail, and a carrier assembly. This carrier assembly comprises a tube, a locking assembly, and the dockable connector. The lower reinforcement assembly comprises a lower base, trim, at least one rib attached to the lower base, and a spool. The wire runs though the ceiling and upper reinforcement assembly into the carrier assembly, dockable connector, and the spool.

The carrier is slidably associated with the upper base and track rail. The carrier assembly with the dockable connector is locked into places along the track rail by engaging over the at least one rib fixedly attached to the lower base.

These and other objects and advantages of the present invention will be more readily understood after a consideration of the drawings and the detailed description of the preferred embodiment which follows.

DETAILED DESCRIPTION OF THE PREFERRED EMBODIMENT

Figure 1:
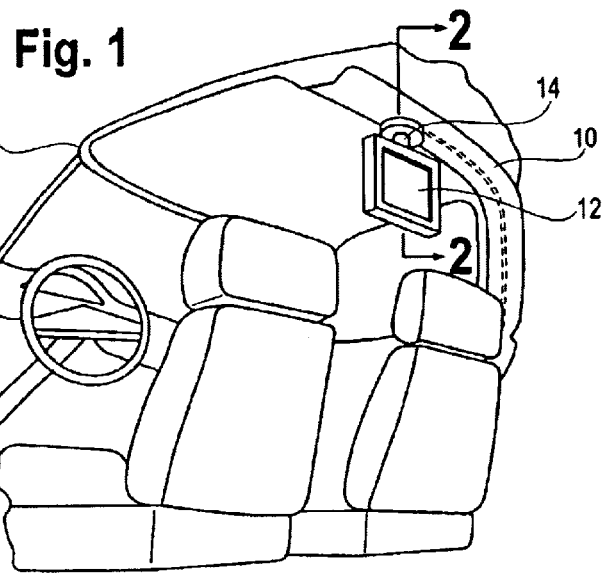
FIG. 1 is a side rear view of a display screen mounted with the dockable connector to the lateral track movement system within the motor vehicle.

Referring initially to FIG. 1, the display screen 12 is shown for use inside a motor vehicle 8, preferably, but not necessarily, mounted to the ceiling in a position generally forward of the passenger seating area (not depicted). The display screen 12 utilizes the dockable connector 14 while sliding on lateral track movement system 10.

Figure 2:
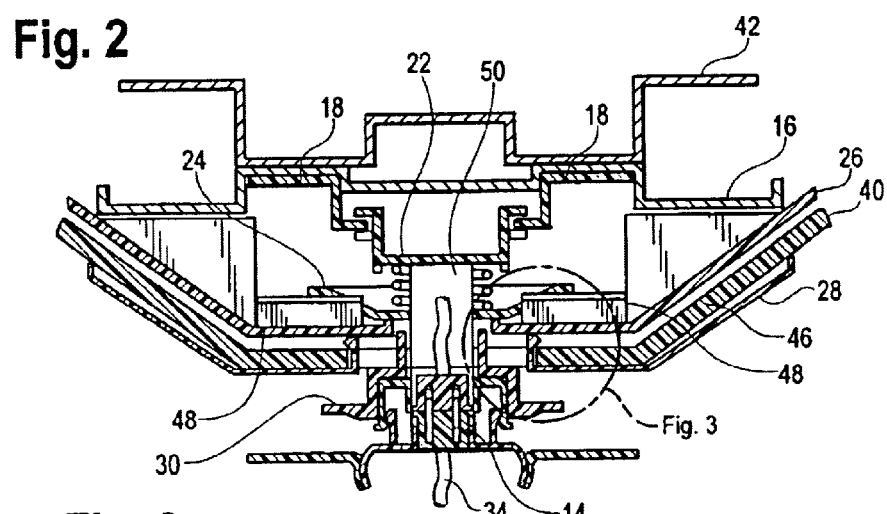
FIG. 2 is a cross-sectional view of the lateral track movement system.
Figure 5:
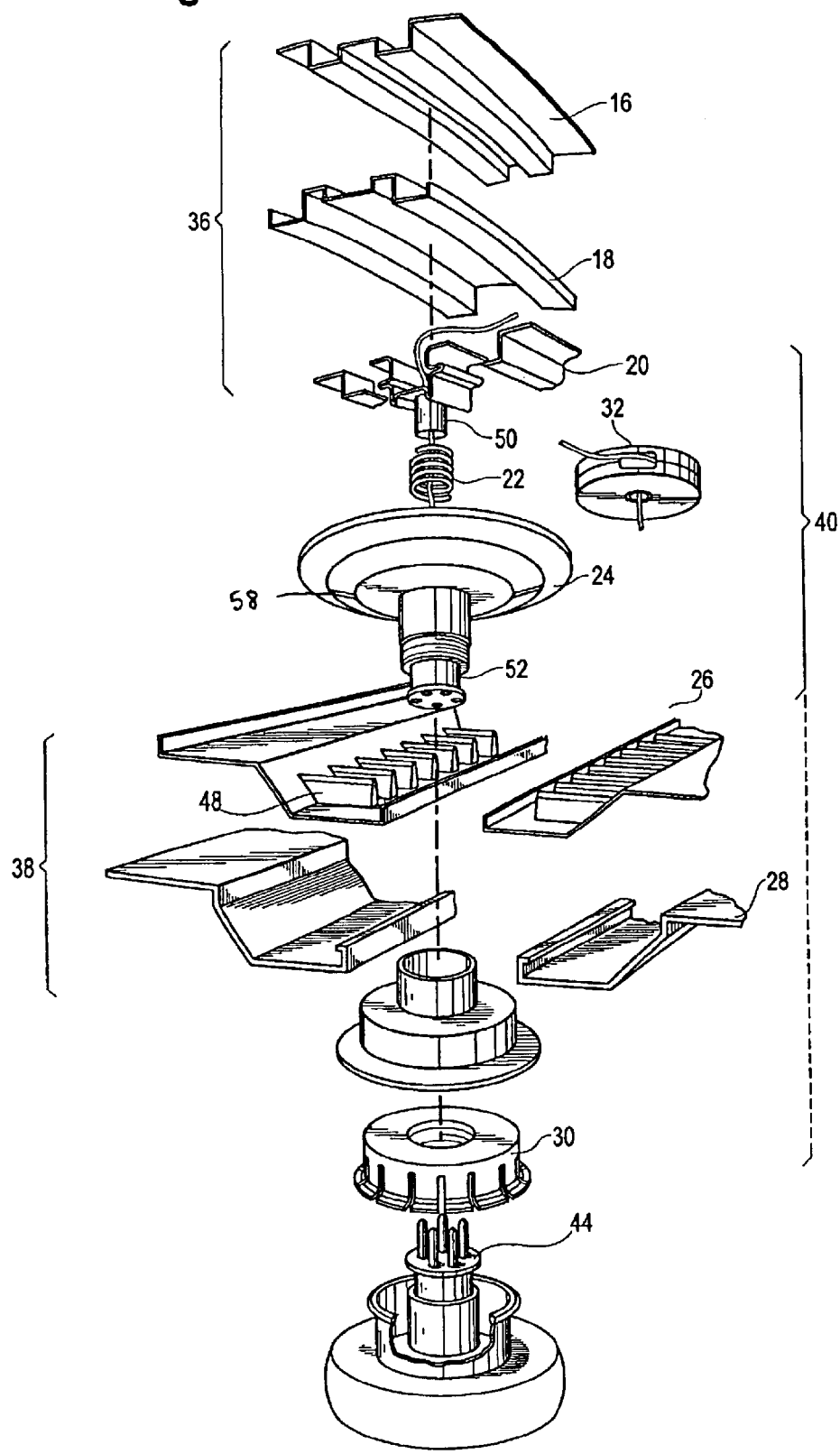
FIG. 5 is an exploded view of the parts involved in the lateral track movement system.

Referring now to FIG. 5, the lateral track movement system comprises an upper reinforcement assembly 36, a carrier assembly 40, a lower reinforcement assembly 38, at least one wire 34, and a spool 32. The upper reinforcement assembly 36 comprises an upper base 16, at least one track rail 18 and a carrier assembly 20. The upper reinforcement assembly 36 is fixedly attached to the ceiling of the motor vehicle 8 by the upper base 16. Referring now to FIG. 2, this upper base 16 is mounted to the roof bow 42 for a strong support. At least one track rail 18 is then attached to the upper base 16. In its preferred embodiment, this invention will utilize two track rails 18.

Referring to both FIG. 2 and FIG. 5, slidably mounted to the two track rails 18, is the carrier assembly 20. The carrier assembly 20 comprises a tube 50, a locking assembly 46, and the dockable connector 14. The locking assembly 46 comprises the spring 22 loaded upper lock 24 and the lower lock 26. Within the locking assembly 46, there is a spring 22 loaded upper lock 24 positioned into the tube 50 of the carrier assembly 20. A portion of the dockable connector 14 is attached to the spring 22 loaded upper lock 24, which in turn is fitted through the lower reinforcement assembly 38. Once through the lower reinforcement assembly 38, the spring 22 loaded upper lock 24 is joined to a lower lock 30 and completes the connection for the dockable connector 14. The display screen 12 is mounted to the dockable connector 14.

Referring to FIG. 5, the lower reinforcement assembly 38 comprises a lower base 26, trim 28, and at least one rib 48. The lower base 26 provides further support for the carrier assembly 20 and the lateral track movement system 10 as a whole. Depicted in FIG. 2, is the trim 28 is snapped over the lower base 26 and headliner 40 mainly for aesthetic purposes. Fixedly attached to the lower base 26 is at least one rib 48. For purposes of this invention, the preferred embodiment will have more then one rib 48 for more positioning locations.

The locking assembly 46 engages onto a rib 48 by a notch 58 to hold the carrier assembly 40 in a locked position. If a passenger desires a new position for the display screen 12, the passenger simply needs to disengage the locking assembly 46 by pushing the lower lock 30 in an upwards position.

Figure 3:
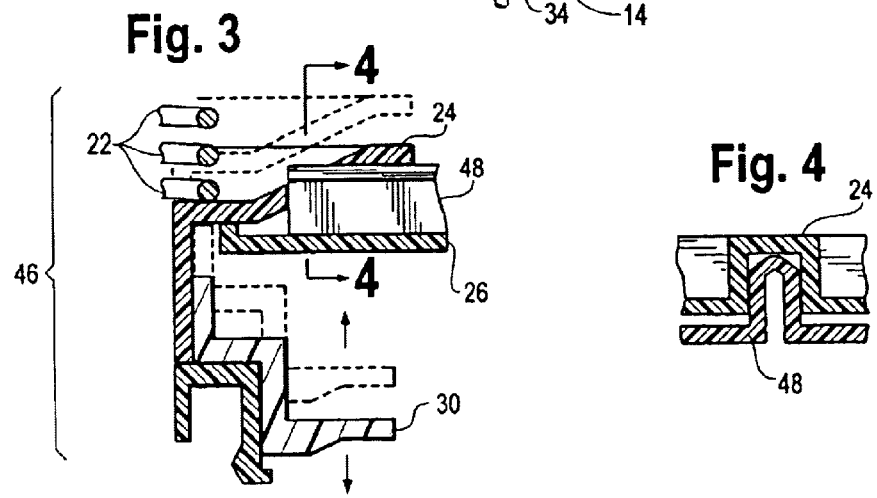
FIG. 3 is an exploded view of the locking assembly.
Figure 4:
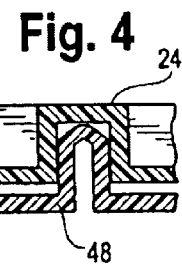
FIG. 4 is a depiction of the upper spring loaded lock engaged over the at least one rib.

This upward motion, as shown in FIG. 3, in turn pushes up on the upper lock 24 and spring 22. This action release the notch 58 and once this occurs, the carrier assembly 40 is free to slide until it hits its next rib 48. When the carrier assembly 40 approaches the rib 48, the notch 58 slides up on the rib 48 and snaps down over it. This action allows the passenger to enjoy lateral movement for the display screen 12 so that he or she can attain any number of desired positions. This locking assembly 46 does not interfere with the dockable connection 14 or the electrical connection that is made within the dockable connection 14. The spring 22 that is loaded onto the upper lock 24 ensures uninterrupted electrical connection within the dockable connector 14. FIG. 4 depicts the upper lock 24 engaged over a rib 48.

In this invention, it is extremely important to provide the adequate electrical wiring so that the display screen 12 will play. To provide this electrical connection, there is at least one wire 34 that is fed down into the lateral track movement system. In its preferred embodiment, this invention will utilize a dockable connection 14 so that the electrical components will be easily accessed. This dockable connection 14 will make its electrical connection once the male connector 44 and the female connector 52 join. The connection point will not be up in the ceiling or side panels as many display screen systems do.

So as to prevent wire entanglement, there is a spool 32. As the carrier assembly 20 slides along the two track rails 18 it is apparent that the wiring for the display screen will need to be contained so as to ensure smooth movement along the two track rails 18. As the carrier assembly 20 slides, it either feeds the at least one wire 34 either into or out of the spool 32.

The above presents a description of the best mode contemplated for carrying out this invention. The claims should not be read as limited to the described order or elements unless stated to that effect. Therefore, all embodiments that come with the scope and spirit of the following claims and equivalents thereto are claimed as the invention.

What is claimed is:

1. In a motor vehicle having a ceiling and a passenger seating area, a lateral track movement system for a dockable connector of a display screen comprising:

upper reinforcement assembly;

a carrier assembly;

a lower reinforcement assembly;

at least one wire, and a spool.

2. The lateral track movement system of claim 1, wherein said lateral track movement system is mounted to said ceiling.

3. The lateral track movement system of claim 2, wherein said lateral track movement system is mounted in a generally forward position from said passenger seating area.

4. The lateral track movement system of claim 3, wherein said lateral track movement system is mounted parallel to said passenger seating area.

5. The lateral track movement system of claim 1, wherein said upper reinforcement assembly further comprises an upper base attached to a roof bow, at least one track rail attached to said upper base and said carrier assembly comprising a tube, a locking assembly, and said dockable connector of said display screen, said carrier assembly holds said dockable connector of said display screen and fits through said lower reinforcement assembly, said lower reinforcement assembly comprises a lower base, trim snapped onto said lower base, at least one rib fixedly attached to said lower base, and said spool, said at least one wire runs through said ceiling said upper reinforcement assembly into said carrier assembly, said dockable connector of said display screen, and said spool.

6. The lateral track movement system of claim 5, comprising two tracks rails.

7. The lateral track movement system of claim 5, comprising a number of ribs fixedly attached and spaced along said lower base.

8. The lateral track movement system of claim 5, wherein said carrier assembly is slidably associated with said upper base and said at least one track rail, said carrier assembly slides along said at least one track rail and ramps up to engage in a locked position over said at least one rib.

9. The lateral track movement system of claim 8, wherein said carrier assembly is locked over said rib by said locking assembly comprising a lower lock and a spring loaded upper lock, said carrier assembly disengaged from said rib when said lower lock is pushed in an upward position thereby pushing up said spring loaded upper lock releasing said carrier assembly to slide along said at least one track rail.

10. The lateral track movement system of claim 5, wherein in said at least one wire allows for electrical connection of said dockable connector of display screen.

11. The lateral track movement system of claim 1, wherein said spool prevents entanglement of said at least one wire.

\* \* \* \* \*